(12) United States Patent
Molz et al.

(10) Patent No.: US 10,760,933 B2
(45) Date of Patent: Sep. 1, 2020

(54) METHOD FOR DETECTING AND DIAGNOSING POWDER FLOW STABILITY

(71) Applicant: OERLIKON METCO (US) INC., Westbury, NY (US)

(72) Inventors: Ronald J. Molz, Farmingville, NY (US); Jose Colmenares, Malverne, NY (US); Elliot M. Cotler, Brooklyn, NY (US); Samrawit Hermosillo, Santa Clara, CA (US); Cristian Ibanez, Hammondsport, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 91 days.

(21) Appl. No.: 15/609,846

(22) Filed: May 31, 2017

(65) Prior Publication Data
US 2018/0313733 A1 Nov. 1, 2018

Related U.S. Application Data

(60) Provisional application No. 62/490,955, filed on Apr. 27, 2017.

(51) Int. Cl.
| | |
|---|---|
| *G01N 7/00* | (2006.01) |
| *G01F 1/34* | (2006.01) |
| *G01F 1/80* | (2006.01) |
| *G01N 29/12* | (2006.01) |
| *G01N 29/14* | (2006.01) |
| *B65G 53/56* | (2006.01) |

(52) U.S. Cl.
CPC .............. *G01F 1/80* (2013.01); *B65G 53/56* (2013.01); *G01N 29/12* (2013.01); *G01N 29/14* (2013.01)

(58) Field of Classification Search
CPC ..... G01F 1/00; G01F 1/43; G01F 1/80; G01F 1/86; G01F 5/00; G01N 7/00; G01N 29/12
See application file for complete search history.

(56) References Cited

U.S. PATENT DOCUMENTS 5,098,229 A * 3/1992 Meier .................. B65G 53/525
406/194
5,487,624 A 1/1996 Toyota et al.
(Continued)

OTHER PUBLICATIONS

Int'l Search Report and Written Opinion conducted in counterpart Int'l Appln. No. PCT/US2018/028544 PCT/ISA/220; PCT/ISA/210 & PCT/ISA/237 (dated Jul. 20, 2018).
(Continued)

*Primary Examiner* — Nguyen Q. Ha
(74) *Attorney, Agent, or Firm* — Greenblum & Bernstein, P.L.C.

(57) ABSTRACT

Powder flow conveying from a powder feeder to a process (i.e. thermal spray gun) can have instabilities that can be detected and diagnosed using a hose back pressure. Incorporating a pressure transducer in a powder hose line at a connection of the powder hose line and the feeder allows the back pressure to be measured in real time at a high sample rate to detect instability and aid in diagnosing a cause of the instability. Diagnosis includes identifying periodic oscillations in the powder hose line such as acoustics as well as detecting hose clogging and hose rupture conditions. Once detected, proper corrective actions can be recommended to correct the cause of the instability.

19 Claims, 6 Drawing Sheets

(56) References Cited

U.S. PATENT DOCUMENTS

| 9,586,306 B2 * | 3/2017 | Zhang .................. B24C 7/0046 |
| 2003/0166378 A1 * | 9/2003 | Fuksshimov ........... B24B 37/04 451/8 |
| 2006/0057301 A1 | 3/2006 | Konig |
| 2006/0093442 A1 | 5/2006 | Kleineidam et al. |
| 2010/0136242 A1 | 3/2010 | Kay et al. |
| 2014/0294517 A1 | 10/2014 | Harvey et al. |

OTHER PUBLICATIONS

Niederreiter, "Untersuchung zur Pfropfenentstehung und Pfropfenstabilität bei der pnetunatischen Dichtstromförderung," Doktor-Ingenieurs genehmigten Dissertation, Technicshe Universität München (Nov. 16, 2005).

* cited by examiner

METHOD FOR DETECTING AND DIAGNOSING POWDER FLOW STABILITY

CROSS-REFERENCE TO RELATED APPLICATION

The instant application claims the benefit under 35 U.S.C. § 119(e) of U.S. Provisional Application No. 62/490,955 filed Apr. 27, 2017, the disclosure of which is expressly incorporated by reference herein in its entirety.

BACKGROUND

Powder feeding using a conveying hose is typically done using flight conveying in which particles are entrained in a carrier gas stream to deliver the powder to an end process such as a spray gun. Instabilities in the flow can develop for a number of reasons resulting in fluctuations of the powder flow that can affect the spraying results.

Lasers have been employed to measure the light transmission through the powder flow stream. However, this method suffers from several drawbacks:
1. The hose conveying the powder stream has to be altered to provide a suitable location, preferably near the process or end use, where the laser can shine through the powder flow. This alteration on its own can introduce instability by creating discontinuities in the flow.
2. The signal attenuation for the laser light transmission is high and, although this provides excellent sensitivity, the signal can quickly become saturated under high flow conditions, preventing proper diagnosis. This is especially the case with high mass flow ratios of powder to carrier gas, in which the powder flow can completely block the laser light transmission.
3. Adding the laser adds considerable cost to the process while also adding complexity to an already complex system that must accurately feed and control powder flow.

The two primary types of powder feeders are fluidic and volumetric. Both types can feed a wide variety of powders ranging in size from about 150 µm to less than 5 µm with powder densities from about 3 g/cc to as high as 15 g/cc. Additionally these feeders can feed powders at a wide range of feed rates from about 1 g/min to as high as 300 g/min. These powder feeders can be utilized in industrial applications in, e.g., pharmaceutical, food processing, thermal spraying, and other suitable industries.

A number of powder feeders incorporate a pressure transducer in the powder line at the exit of the powder feeder, e.g., Oerlikon Metco 9MP-CL. The transducer is used to define a hose pressure feedback that is in turn used to calculate the hopper differential pressure required to control the feed rate in a fluidic feeder using a gravimetric setup. The hose back pressure in some versions of powder feeders can also be used as a safety detection to isolate the powder hopper under sudden or unexpected high back pressure conditions. This signal is also displayed on the powder feeder as a heavily filtered signal, which is updated about once per second. To date no feeder has attempted to use the pressure signal to determine whether the powder flow in the hose is stable.

SUMMARY

In embodiments, powder flow conveyed from a powder feeder to a process (i.e., thermal spray gun) can have instabilities that can be detected and diagnosed using the hose back pressure. Incorporating a pressure transducer in the powder hose line, e.g., at the connection of the powder line to the feeder, allows the back pressure to be measured in real time at a high sample rate to detect instability and to aid in diagnosing the cause of the instability. Diagnosis includes identifying periodic oscillations in the hose such as acoustics as well as detecting hose clogging and hose rupture conditions. Once detected, proper corrective actions can be advised, recommended and/or taken to correct the cause of the instability.

Accordingly, embodiments are directed to a device and method to detect powder flow fluctuations and to detect and diagnose instabilities when they occur. Preferably, these devices and methods do not require additional instrumentation.

Embodiments of the invention are directed to a method for detecting and/or diagnosing problems with powder conveying. A powder entrained in a carrier gas is guided through a powder feed hose from a hopper to an end process and the method includes monitoring a pressure in the powder feed hose, and, based on the monitored pressure, at least one of: detecting a missing or damaged powder feed hose; detecting powder feed hose clogging; and detecting and diagnosing feed instability.

According to embodiments, a lack of powder hose back pressure may be indicative of the missing or damaged powder feed hose. Further, increasing powder feed hose back pressure under steady state flow conditions may be indicative of the powder feed hose clogging. In embodiments, when the powder feed hose is neither missing or damaged nor clogged, the method can further include calculating a standard deviation in the monitored powder feed hose pressure, wherein a standard deviation in excess of a predetermined value detects feed instability. The predetermined value for the standard deviation can be 5% over ten seconds. In embodiments, the method can also include digitizing the monitored powder feed hose pressure to calculate the standard deviation.

In accordance with embodiments of the invention, when feed instability is detected, the method can further include analyzing the powder feed hose pressure to identify periodic oscillation frequencies. Identified oscillation frequencies within a range between 0.4 to about 2.0 Hz are indicative of acoustical oscillations in the powder feed hose, identified oscillation frequencies lower than 0.4 Hz are indicative of flow transitions having a mass flow rate ratio of the powder to the carrier gas in excess of a predetermined mass flow ratio, and identified oscillation frequencies higher than 2.0 Hz are indicative of control oscillations caused by a pressure ratio between a differential pressure in the hopper and the powder feed hose pressure being outside a predetermined pressure ratio range. Moreover, at least one of: the acoustical oscillations can be correctable by changing a length of the powder feed hose; the predetermined mass flow ratio can be 15 and the flow transitions may be correctable by reducing the mass flow ratio to less than 15; and the predetermined pressure ratio range can be between 0.5 and 2.0 and the control oscillations may be correctable by changing hardware of the feeder such that the pressure ratio is greater than 0.5 and less than 2.0. Still further, when the analyzing of the powder feed hose pressure does not identify periodic oscillation frequencies, the method can also include determining whether the mass flow rate ratio of the powder to the carrier gas is in excess of the predetermined mass flow ratio; determining whether the pressure ratio between a differential pressure in the hopper and the powder feed hose pressure is outside the predetermined pressure ratio range; one of:

determining whether the differential pressure in the hopper is at an upper end or a lower end of an operating window and determining whether one of a disc or screw speed is at an upper end or a lower end of an operating range; determining whether the feeder is damaged; and determining whether the powder at least one of is wet, is contaminated and has poor flow characteristics.

In embodiments, the analyzing of the powder feed hose pressure can include conducting Fast Fourier Transform (FFT) frequency analysis or similar numerical methods to convert the time based pressure signal to a frequency domain.

Embodiments of the invention are directed to a system for detecting and/or diagnosing problems with powder conveying. The system includes a powder feed hose through which a powder is conveyed; a pressure transducer arranged to detect a pressure within the powder feed hose; and feeder diagnostics coupled to the pressure transducer to monitor the pressure within the powder feed hose to at least one of: detect a missing or damaged powder feed hose; detect a hose clog; and detect and diagnose feed instability.

In embodiments, the system can further include a feeder arranged to dose the powder into the powder feed hose and an end process to which the powder is conveyed through the powder feed hose.

According to embodiments, the pressure transducer can be external to the feeder. In particular, the pressure transducer can be arranged to detect powder feed hose pressure at any point along a powder conveyance path between the feeder and the end process, or the pressure transducer can be arranged to detect powder feed hose pressure between the feeder and one-half a length of the powder feed hose. Further, the feeder may include a hopper and the pressure transducer can be arranged at an exit of one of the feeder and the hopper. In embodiments, the feeder diagnostics can be external to the feeder. In embodiments, the pressure transducer can be integrated in the feeder. Further, the feeder diagnostics can be integrated in the feeder.

In accordance with still yet other embodiments of the present invention, the feeder diagnostics can be adapted to analyze the powder feed hose pressure in order to identify periodic oscillation frequencies.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 2:
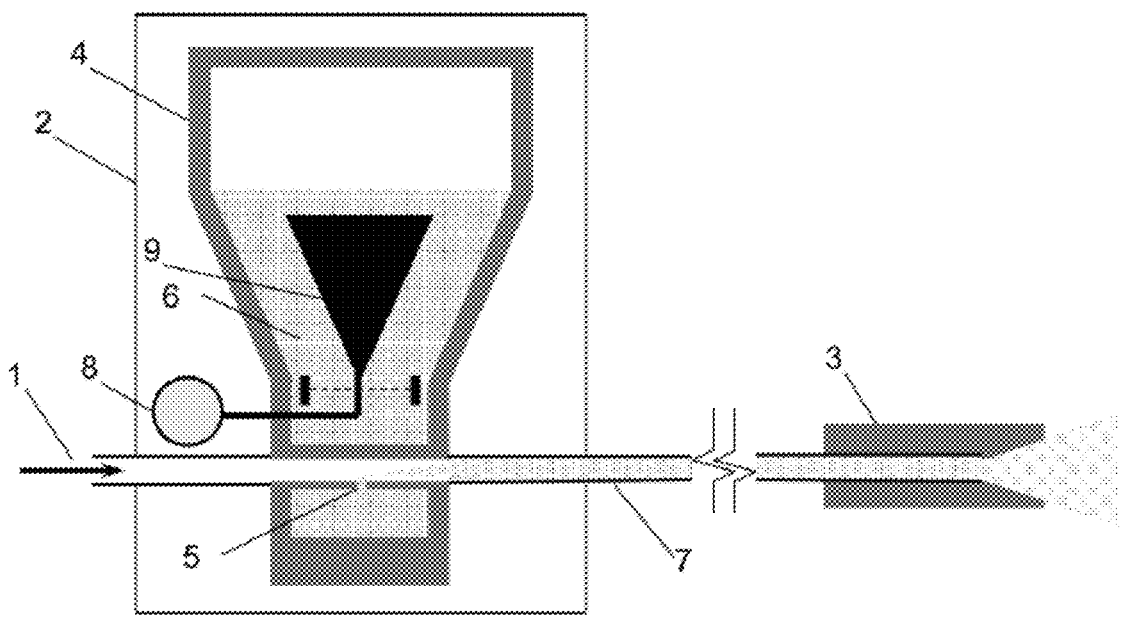
FIG. 2 illustrates a block diagram for a known fluidic type powder feeder.

FIG. 2 shows a functional block diagram of a fluidic type powder feeder of a known type. A carrier gas stream 1 is supplied from a carrier gas supply (not shown) through a hose 7 passing through a bottom portion of a pressurized hopper 4 to transports a powder 6 from a feeder 2 to a process 3, e.g., a spray gun. Powder 6 in hopper 4 is drawn into hose 7 through a small hole 5 and is entrained with the flowing carrier gas stream 1 to process 3. A powder feed rate of powder 6 through hose 7 is determined or established by a pressure difference between pressurized hopper 4 and a pressure of hose 7. Hopper 4 includes either a gas vibrator 8 driven agitator 9 or a mechanical agitator (not shown), e.g., a stirrer, to fluidize powder 6 in the bottom portion of hopper 4 to aid in flow of powder 6 into carrier gas stream 1 for conveyance via hose 7.

Figure 3:
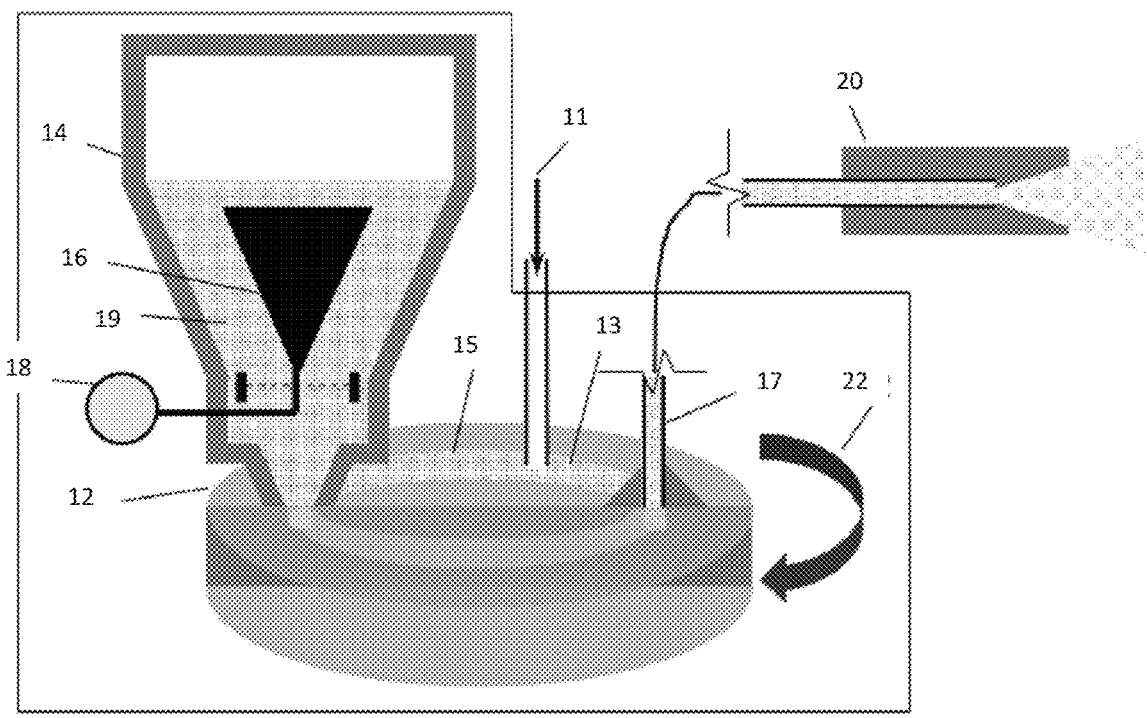
FIG. 3 illustrates a block diagram for a known volumetric type powder feeder.

FIG. 3 shows a functional block diagram of a disc or volumetric type powder feeder of known type. A powder hopper 14, containing a powder 6, supplies powder 6 through an outlet at the bottom of hopper 14 into a groove 15 of a rotating disc 12. Disc 12 rotates in the direction 22 to convey powder 19 from hopper 14 to a hose 17. As powder 19 is conveyed toward hose 17, a carrier gas stream 11, supplied from a carrier gas supply (not shown), is directed into a groove 15 so that a powder flow 13, i.e., powder 19 entrained in carrier gas stream 11, is guided to powder hose 7 and transported to a process 20, e.g., a spray gun. Hopper 14 includes either a gas vibrator 18 driven agitator 16 or a mechanical agitator (not shown), e.g., a stirrer, to fluidize powder 19 in the bottom portion of hopper 1 to aid in flow of powder 19 into groove 15 of rotating disc 12. The rotation speed of disc 12, which can be about 10-30 rpm, determines the powder feed rate.

Figure 4:
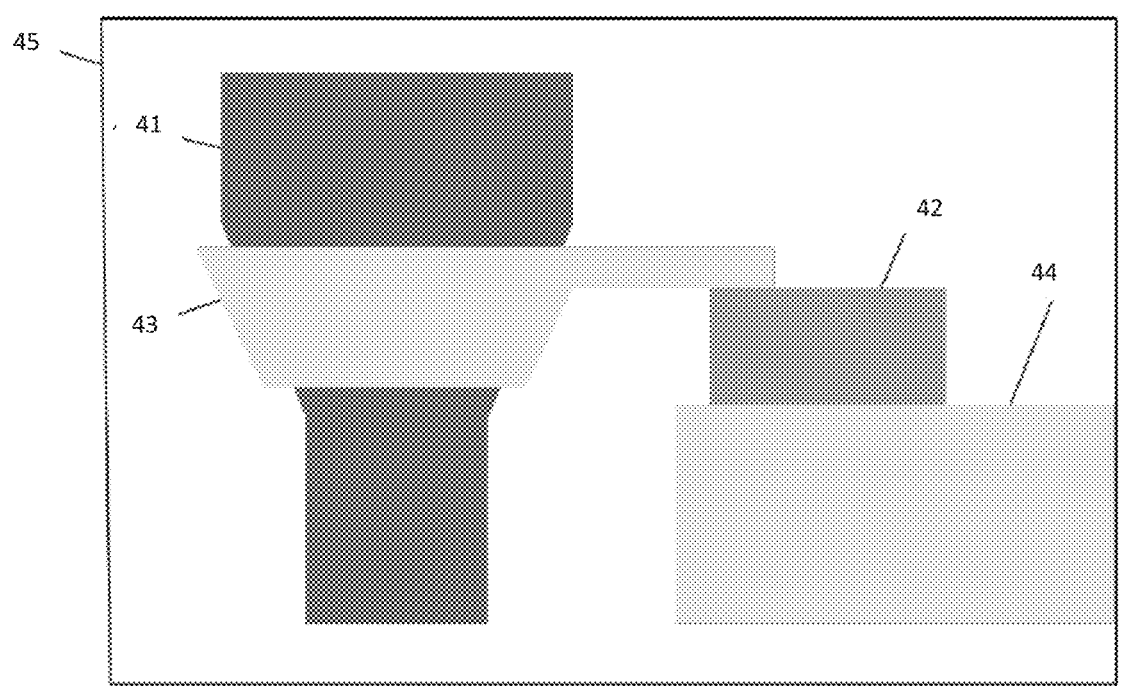
FIG. 4 illustrates a block diagram for a known gravimetric type powder feeder.

The known fluidic and volumetric powder feeders can be provided with gravimetric control. FIG. 4 shows a functional block diagram of an exemplary a known arrangement of a fluidic type powder feeder with gravimetric control. A hopper 41 can be arranged on a bracket 43 attached to a weigh scale 42, which is mounted to a fixed base 44 of feeder 45. The powder feed rate is directly controlled by weight loss measured by weigh scale 42 and is used to adjust the hopper pressure (fluidic) or disc speed (volumetric) to obtain the desired powder feed rate.

Other methods of feeding and/or metering powder into a carrier gas stream exist including rotating screws and the use of such rotating screws can be utilized in embodiments without departing from the spirit and scope of the invention.

The process supplied by the known powder feeders can include spray guns, which can include but are not limited to powder paint sprayers, thermal spray guns, and powder dispensers.

In known powder feeders, instabilities in the powder flow can arise in which acoustical oscillations, hose clogging and/or hose rupture/disconnection conditions arise. Accordingly, it is desired to detect the occurrence of such instabilities to ensure consistent quality in the end product and in the worst case prevent damaging the feeder system. It is further desired to diagnose the detected instability so that corrective action can be taken to remove the instability from the feeder system. In detecting the occurrence of instabilities in the powder flow, active monitoring of hose pressure feedback can be used to diagnose whether:

1. the powder hose has been accidentally disconnected or broken during operation. In such a situation, the actively monitored hose pressure will not be present or will not register at a sufficiently high enough value to indicate the presence of a functioning powder hose. Thus, the first diagnostic is hose breakage via lack of hose back pressure.
2. the powder hose is clogging or clogged. In this situation, the pressure in the powder hose increases during steady state operation, i.e., where carrier flow and powder flow are constant. Thus, the second diagnostic is hose clogging via increasing hose back pressure.
3. there is an instability in the feeding or conveying process. In this situation, the standard deviation of the hose back pressure exceeds a certain preset value. Moreover, by analyzing the type or pattern of the instability, the cause of the instability can be determined, as well as corrective actions for reducing or eliminating the instability. This corrective action can be automatic or manual actions, such as changing hardware setup and/or changing operating parameters. Of course, other corrective actions to reduce or eliminate the instabilities can be taken without departing from the spirit and scope of the embodiments. This diagnostic is described in the flow diagram shown in FIG. 1, where at 101 the pressure of the powder hose is determined. In this regard, a pressure transducer, e.g., Omegadyne PX209-015G10V, Prosense SPT25-10-0100A, can be arranged to read the powder hose pressure. If the transducer does not produce a digital data, analog data from the transducer can be converted to digital. At 102, standard deviation in the powder hose pressure is calculated to detect instability. A frequency analysis of the powder hose pressure is conducted at 103 to further assist in the diagnosis. Finally, at 104, the cause of the instability is diagnosed based upon the frequency and operation conditions.

Figure 1:
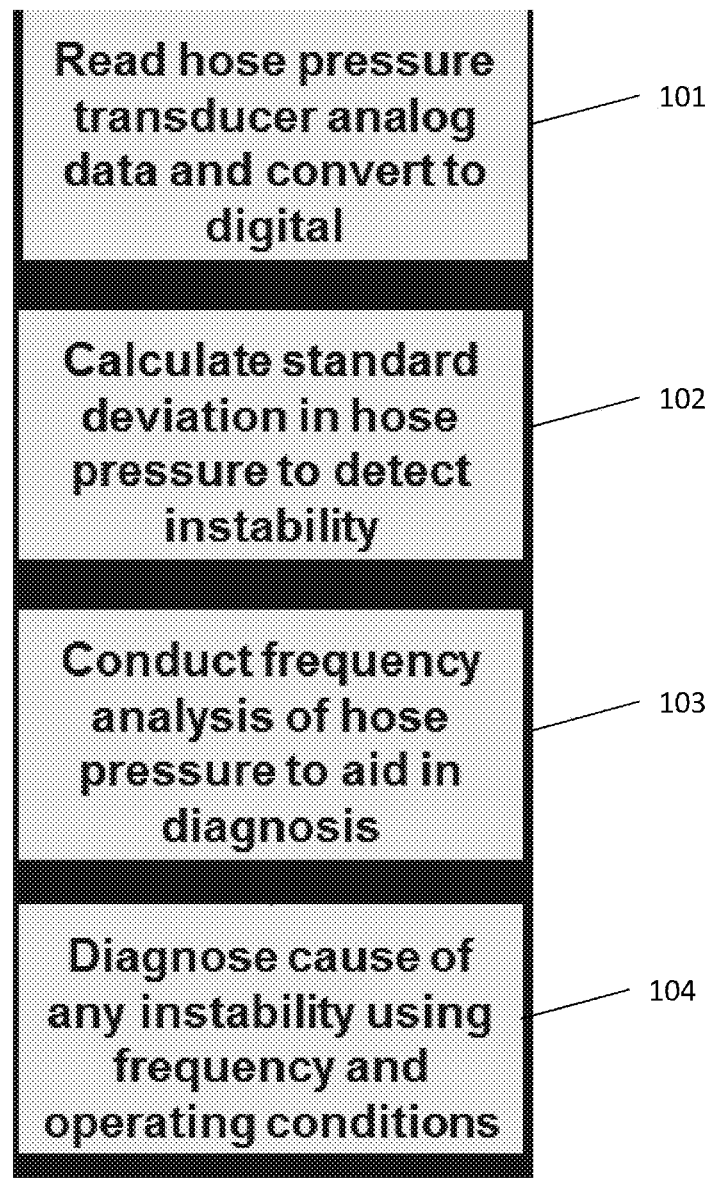
FIG. 1 illustrates a flow diagram of an exemplary method of powder hose diagnostics.

In order to perform a full range of flow stability diagnostics, i.e., as in the flow diagram of FIG. 1, the hose pressure feedback needs to be scanned at a sufficiently high sample rate, see 101. While sampling rates greater than 100 can be utilized, e.g., up to and above 100,000 samples per second, it has been found that using sampling rates above 50 samples per second do not generally provide additional information for the diagnostics. Therefore, the sample rate can be as low as 10 samples per second, is preferably between 10 and 100,000 samples per second, more preferably between 10 and 1000 samples per second, and even more preferably between 10 and 100 samples per second.

As set forth at 102 in FIG. 1, the standard deviation in the powder hose pressure values is calculated. If the calculated standard deviation exceeds a preset value, e.g., within range of 1%-10% over a 1-30 second time interval, and preferably within a range of 3%-7% over a 5-20 second time interval and most preferably of 5% over a ten second time interval, the powder hose is deemed to have an instability, the cause of which can be diagnosed at 104. The powder hose pressure values are fed into a frequency analysis program, e.g., a fast Fourier transform (FFT), to identify any periodic oscillation frequencies. Based on the frequency analysis, the following causes of instability can be diagnosed:

1. periodic oscillations within a frequency range between 0.4 to about 2.0 Hz are typically indicative of acoustical oscillations in the powder hose. These oscillations can, under some conditions, be rather large (see, e.g., FIG. 6, where the pressure varies by 38% of the total pressure or about 1.44 psi (99.3 mbar)) and can exceed 50% of the total pressure, e.g., 100 mbar (1.45 psi). These oscillations can be readily observed due to their large magnitude in spray plume of the process as the mass flow of powder oscillates in sync with the pressure oscillations.
2. periodic oscillations of a frequency range less than 0.4 Hz are typically indicative of flow transitions created by a high mass flow ratio of powder flow to carrier gas flow, e.g., at a mass flow ratio of or in excess of 10, preferably at a mass flow ratio of or in excess of 12, and most preferably a mass flow ratio of or in excess of 15. With this diagnosis, a mass flow ratio of powder flow to carrier gas flow exceeding the high mass flow ratio can be calculated to confirm the cause of the instability.
3. periodic oscillations in a frequency range higher than 2.0 Hz are typically indicative of control oscillations caused by pressure imbalances with fluidic type feeders. With this diagnosis, a pressure ratio between the hopper differential pressure and the hose pressure lower than 0.5 or higher than 2.0, where it is understood that a pressure ratio between 0.5 and 2.0 is stable, can be calculated to confirm the cause of the instability. As volumetric type feeders maintain a same pressure between the hopper and the powder hose, this pressure imbalance will not occur in volumetric type feeders.

If no distinct periodic frequencies are detected in the frequency analysis, there may be multiple problems from which a process of elimination for the following conditions can be utilized to ascertain the causes.

1. If the mass flow ratio of powder to carrier gas is a high mass flow ratio, e.g., 10-20, preferably 12-18, and most preferably at or above 15, then this is the likely cause of instability. This diagnosis is applicable to both fluidic and volumetric type feeders. Moreover, in the event of finding high mass flow ratio as the cause of instability, corrective action can be taken to reduce the mass flow ratio of powder to carrier gas to less than the defined high mass flow ratio.
2. If the pressure ratio between the hopper differential pressure and the powder hose pressure is lower than 0.5 or greater than 2.0, then a pressure imbalance between the hopper differential pressure and the powder hose pressure is the likely cause of instability. This is applicable to fluidic feeders only, as volumetric feeders keep these pressures the same. In the event of finding such a pressure imbalance, corrective action can be taken to change the feeder hardware, e.g., hose diameter, powder pick-up hole diameter, etc., to alter the pressure ratio until it is within the limits.

3. If a hopper differential pressure is at the low end, e.g., a 10% or lower, or at a top end, e.g., 90% or higher, of a target operating window of the fluidic powder feeder, this can be indicative of the cause of the instability in fluidic feeders. By way of example, assuming a target operating window of 1-15 psi (0.069-1.034 bar), when the hopper differential pressure is within the low end, e.g., 1-2.4 psi (0.069-0.166 bar), or within the top end, e.g., 13.6-15 psi (0.038-1.034 bar), this can be indicative of the cause of the instability in fluidic feeders. In volumetric feeders, if the disc or screw speed is at a top end, e.g., 90% or higher, or at a low end, e.g., 10% or lower, of a normal operating range of the volumetric powder feeder, this can be the likely cause of instability. Thus, by way of example, assuming a normal operating range of 1-30 rpm, when the disc or screw speed is within a low end, e.g., 1-3.9 rpm, or a high end, e.g., 27.1-30 rpm, this can be the likely cause of instability.

4. If none of the above conditions are satisfied, then the cause of the instability is likely either the powder itself, e.g., wet, contaminated, poor flow characteristics such as static cling, etc., or damage to the feeding equipment, e.g., unstable regulator, internal leak, etc. In this event, corrective actions can be taken to perform, preferably in this order, but not necessarily, leak check of the feeder, recalibrate the feeder, and try another lot of powder.

When multiple instabilities are detected, the largest instability, e.g., the largest amplitude frequency identified in the frequency analysis, is diagnosed for correction. Then, each identified instability is subsequently diagnosed, e.g., in order of decreasing frequency amplitude.

Embodiments of the method are applicable to any powder feeder using flight conveying, i.e., entraining powder in a carrier gas, to transport particles to an end process, including, but not limited to:

Gravimetric feeders
Volumetric Feeders
Fluidic Feeders

Figure 7:
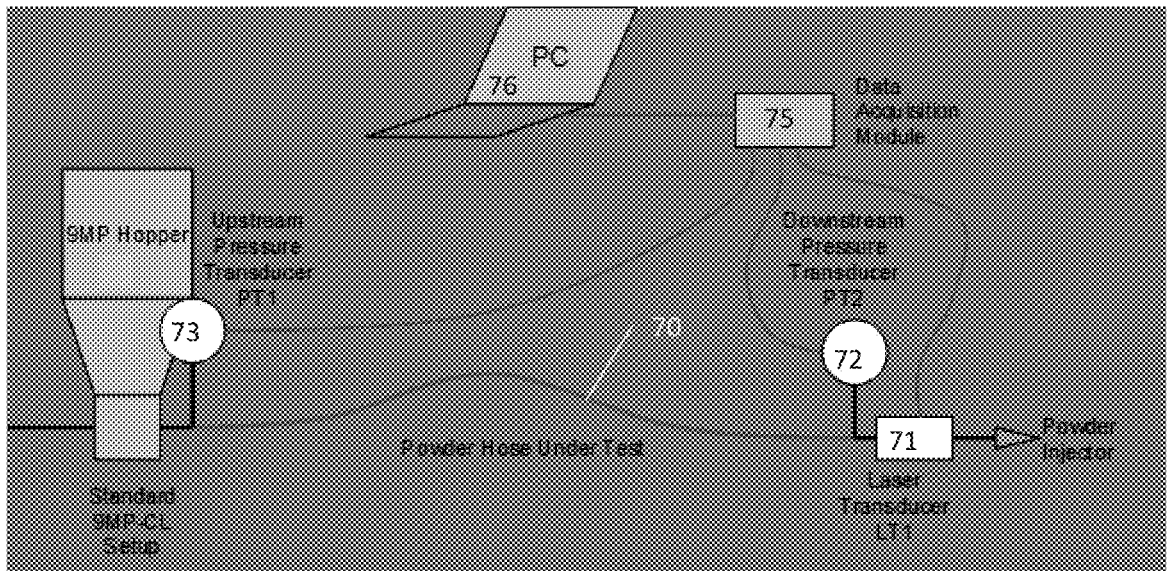
FIG. 7 illustrates an exemplary test rig for instrumenting the powder hose with a pressure transducers and a laser transducer.

To perform and test the method according to the embodiments described in the pending application, a test rig was configured to instrument the conditions inside the powder hose. FIG. 7 shows a block diagram of the test rig setup. The powder feed hose 70 was instrumented in three different ways:

1. a laser 71, e.g., Keyence IB-05 with Keyence IB-1000 control module, arranged toward the powder exit end of powder hose 70 to measure light transmission through the powder flowing with the carrier gas in powder hose 70. It was found that fluctuations in powder flow will then result in fluctuations in light transmission through the powder in the hose.
2. a pressure transducer 72, e.g., Omegadyne PX209-015G10V, was installed in a tee in the hose located toward the powder exit end of powder hose 70 to measure the pressure at the downstream end of the powder hose 70 near the process, i.e., downstream pressure. It was found that fluctuations in powder flow result in downstream pressure fluctuations.
3. a pressure transducer 73, e.g., Omegadyne PX209-015G10V, was installed in a tee in the hose located toward the powder entry end of powder hose 70 to measure the pressure at the upstream end of the hose, i.e., upstream pressure. It was found that fluctuations in powder flow would result in pressure fluctuations. Further, as some known powder feeders, e.g., Oerlikon Metco 9MP, include a pressure transducer to define a hose pressure feedback used to calculate the hopper differential pressure, such a pressure transducer can additionally be utilized to measure the upstream pressure in accordance with the embodiments. Moreover, in powder feeders without such a pressure transduce, locating the pressure transducer at an outlet of the hopper or an inlet to the hose has been found to provide advantageous results.

In an exemplary embodiment, a powder feeder, e.g., a fluidic powder feeder, such as an Oerlikon Metco 9MP-CL, an Oerlikon Metco 9MP or 5MPE, or older generation models such as an Oerlikon Metco 4MP or 9MP-DJ, was provisioned to feed a powder, e.g., chrome oxide powder with a −45+22 μm grain size, via a carrier gas, e.g., Argon gas flowing at 6 normal liters per minute (nlpm), through powder hose 70, which can be, e.g., a standard 9 foot long 3/16" diameter powder hose. It is noted that any powder/grain sizes suitable for use with the selected powder feeder can be utilized without departing from the spirit and scope of the embodiments. Again, any size hose suitable for use with the selected feeder and the specifics of the powder, etc., can be utilized without departing from the spirit and scope of the embodiments. With such a test rig setup, it was found that, at feed parameters of 40 g/min, feed instability was induced in the powder hose and the resulting laser light transmission values and upstream and downstream pressures in hose 70 were measured. To analyze the results above-noted instrumentations of the powder feeder, laser transducer 71 and pressure transducers 72, 73 can be coupled to a data acquisition module 75, e.g., National Instruments NI USB-6009, to read the transducers' outputs and to forward the acquired digital data to a data processing system 76, e.g., a computer, that includes a storage device for storing a set of instructions, e.g., for receiving and plotting from the acquired data the light transmission values and the pressures over time.

Figure 5:
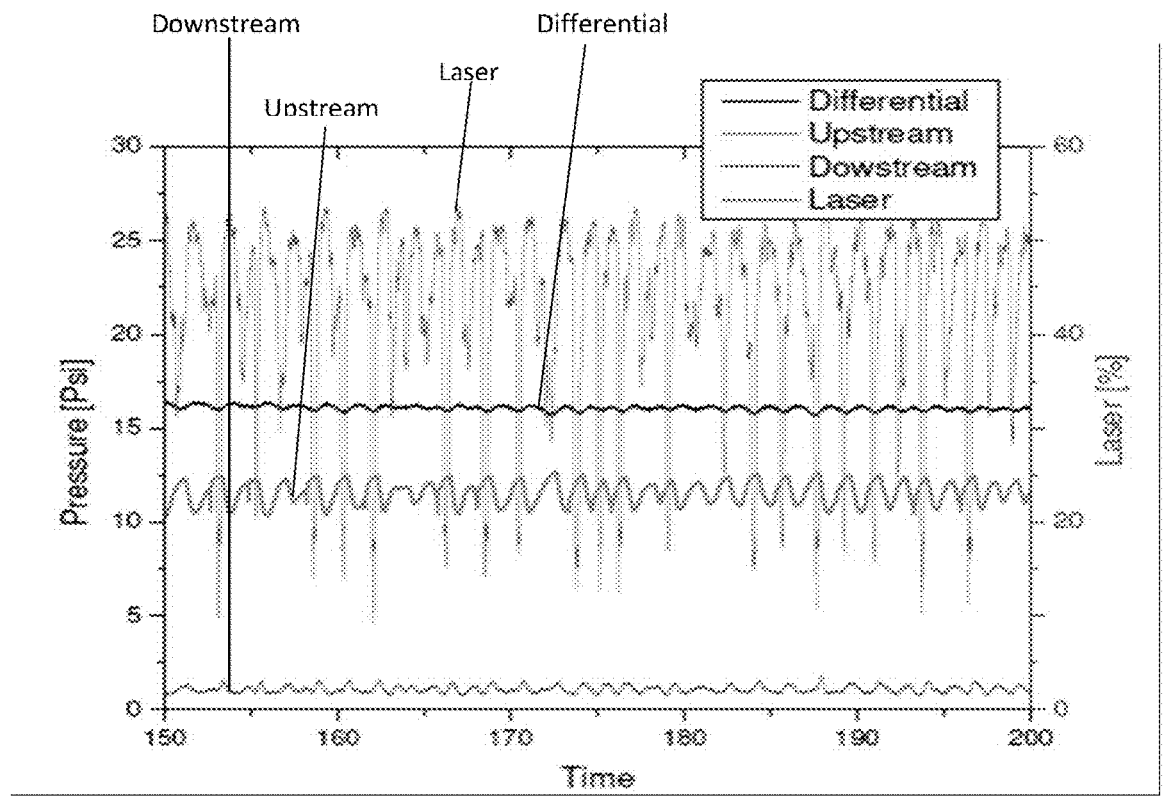
FIG. 5 graphically depicts of various measurements of instability in a powder hose.

FIG. 5 illustrates the results of the measurements taken in the test rig of FIG. 7. In particular, it was found that the laser signal amplitude exceeded 50% of total light blockage in this test, indicating that, despite the powder feed rate not being very high or unstable, the attenuation using a laser is very high. Thus, in the event of a very unstable flow or a high powder feed rate, the laser signal in laser transducer 71 could easily saturate and, therefore, not be usable for diagnosing the feeder system. The downstream pressure signal amplitude from pressure transducer 72 was found to be very low, which makes detection of flow instability difficult. The upstream pressure signal amplitude from pressure transducer 73 produced sufficient signal amplitude to make detection feasible, while still allowing for sufficient range for the pressure transducer to avoid signal saturation. A differential pressure calculated as a difference between the hopper pressure and the hose pressure was also plotted and found to be low.

Based on these results, the inventors found that the upstream pressure information read by transducer 73 provides the most advantageous results in detecting and measuring powder flow instability in the feeder system. Thus, the detection and diagnosis of instability in powder hose 70 can be performed with data acquired from pressure transducer 73 at the outlet of hopper 74/inlet of hose 70. To analyze the results, pressure transducers 73 is coupled to data acquisition module 75, e.g., National Instruments NI USB-6009, to read the pressure transducer's output and to forward the acquired digital data to a data processing system 76, e.g., a computer or PLC, that includes a storage device for storing a set of instructions, e.g., for performing frequency analysis, such as FFT, on the acquired data, and a processor for receiving and processing the set instructions to produce and provide the frequency analysis of the acquired data. Further, storage device or a separate storage device can store a further set of instructions that can be processed by the processor to monitor and maintain the pressure differential in hopper 74. A display readable by the user can receive the results of the frequency analysis. The processor can also send to the display corrective actions for the user to take to alleviate the calculated instability in the powder hose 70. The display can be incorporated into data processing system 76 or can be a separate display that is configured to receive the data to be displayed from data processing system 76 by wired or wireless transmission.

Figure 6:
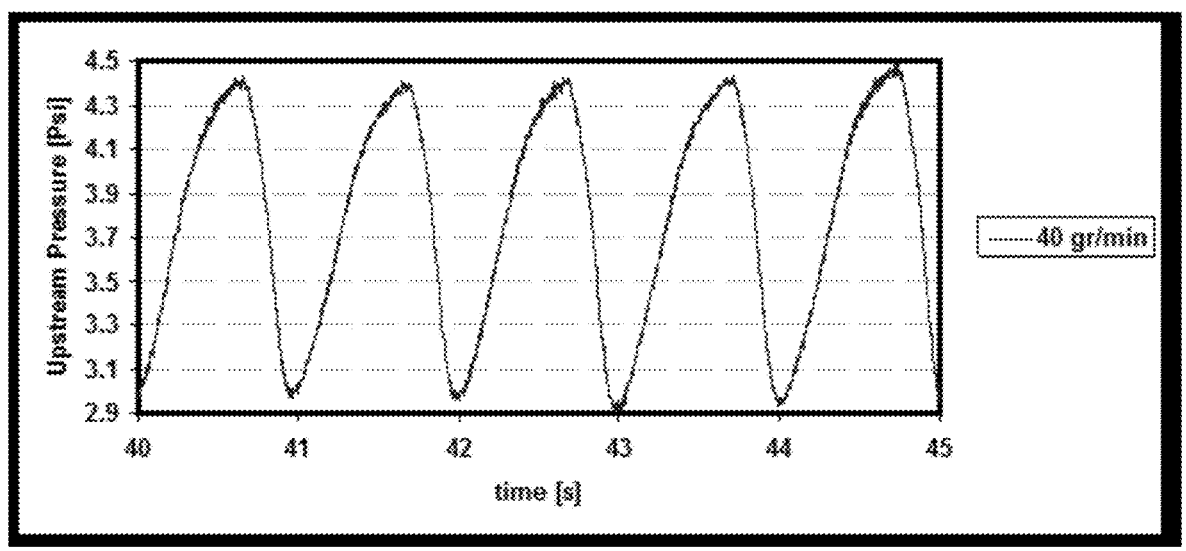
FIG. 6 graphically depicts an upstream pressure measurement of acoustical oscillation in a powder hose.
Figure 8:
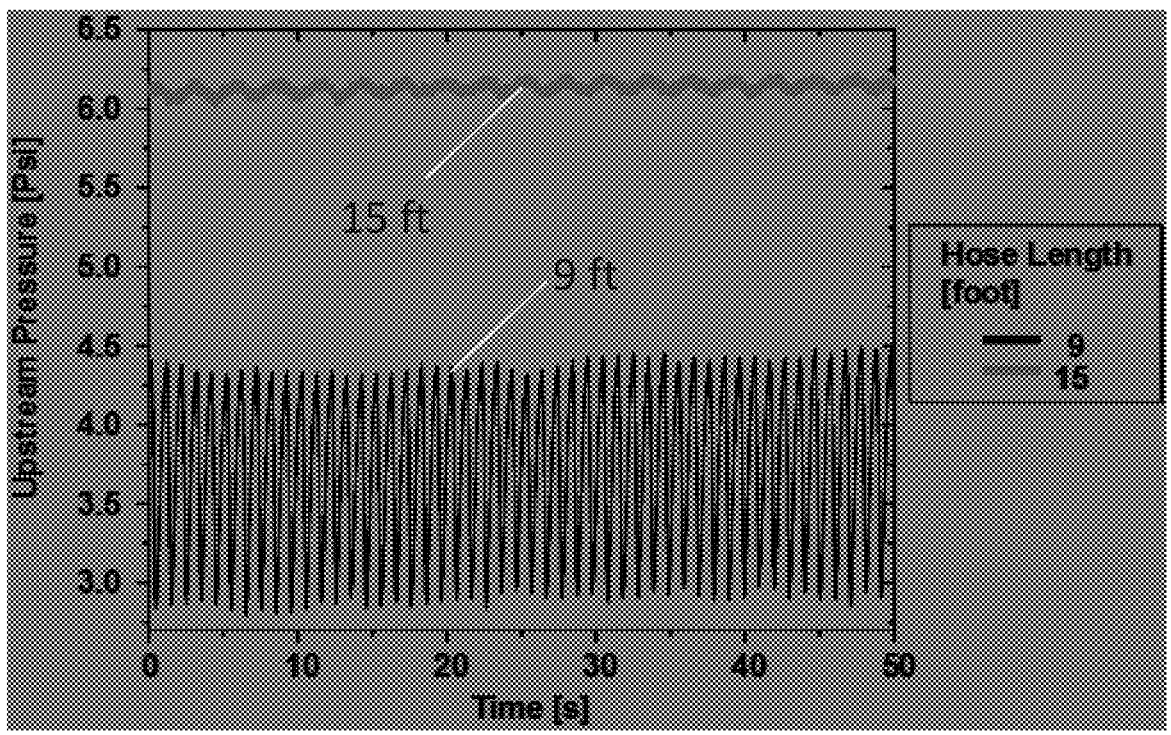
FIG. 8 graphically depicts a comparison of upstream pressure before corrective action to address acoustical oscillation in a powder hose and after corrective action is taken.

Analysis of other results from the test rig revealed the instability had a periodic frequency of about 0.65 Hz. Moreover, it was discovered that this periodic instability was a result of acoustical resonance in powder hose 70, which is one of the prime causes of powder flow instability. Further analysis of the test rig results confirmed that the acoustic nature of the oscillation follows general acoustic theory. FIG. 6 shows an exemplary plot of an oscillation resulting from raising the carrier gas flow, e.g., from 6 nlpm to 10 nlpm at the same 40 g/min powder flow rate. Here, the resulting oscillation frequency is almost exactly 1.0 Hz. Additional testing also revealed that the frequency range for these acoustical oscillations range from about 0.4 to as high as 2.0 Hz. Various corrective actions were taken to address the acoustic oscillations, and it was discovered that merely changing the length of the powder hose can greatly reduce or eliminate the resonance. By way of example, FIG. 8 shows the upstream pressure in a 9 foot length of hose through which the powder is conveyed that is an approximately 1 Hz periodic oscillating signal with an amplitude of about 1.5 psi (103 mbar), while, when changed to a 15 foot length of hose, the periodic oscillation was decreased by almost an order of magnitude while the frequency dropped to about 0.4 Hz.

In other tests, e.g., with various powders ranging in density from 3 g/cc to as high as 15 g/cc, it was found that mass flow ratios of powder to carrier gas exceeding 15 resulted in unstable flow with all powders. While some powders exhibited unstable flow with mass flow ratios as low as 10, all tested powders became unstable once the mass flow ratio reached 15. This simulation of the powder flow through the powder hose also supported the inventors' findings of the onset of instability at roughly the same mass flow ratio based on computational and experimental work done at the University of Munich (Niederreiter, 2005) (See G. Niederreiter, "Untersuchung zur Pfropfenentstehung and Pfropfenstabilität bei der pneumatischen Dichtstromförderung", Doktor-Ingenieurs genehmigten Dissertation, Technische Universität München, 16.11.2005, the disclosure of which is expressly incorporated by reference herein in its entirety). Further, it was found that, if the powder is allowed to continue flowing under this high mass flow ratio condition, there is good potential for the powder hose to undergo flow transition and eventually clog. Thus, it was found that, by detecting and alerting of a need to lower the mass flow ratio in a timely fashion will prevent a clogging of the powder hose.

In still other tests, a number of different powders, e.g., Metco 601 Aluminum Polyester Blend, Amdry 9951 CoNiCrAlY, and Amdry 6415 Chrome Oxide, were fed via the exemplary fluidic powder feeder of the test rig under different flow conditions of carrier gas and powder flow with un-optimized feed hardware setups. Consequently, pressure imbalance between the hopper differential pressure and the hose pressure resulted in some of the test conditions. Moreover, in this test, no acoustical oscillations were generated and the mass flow ratio of powder to carrier gas remained below 15.

Figure 9:
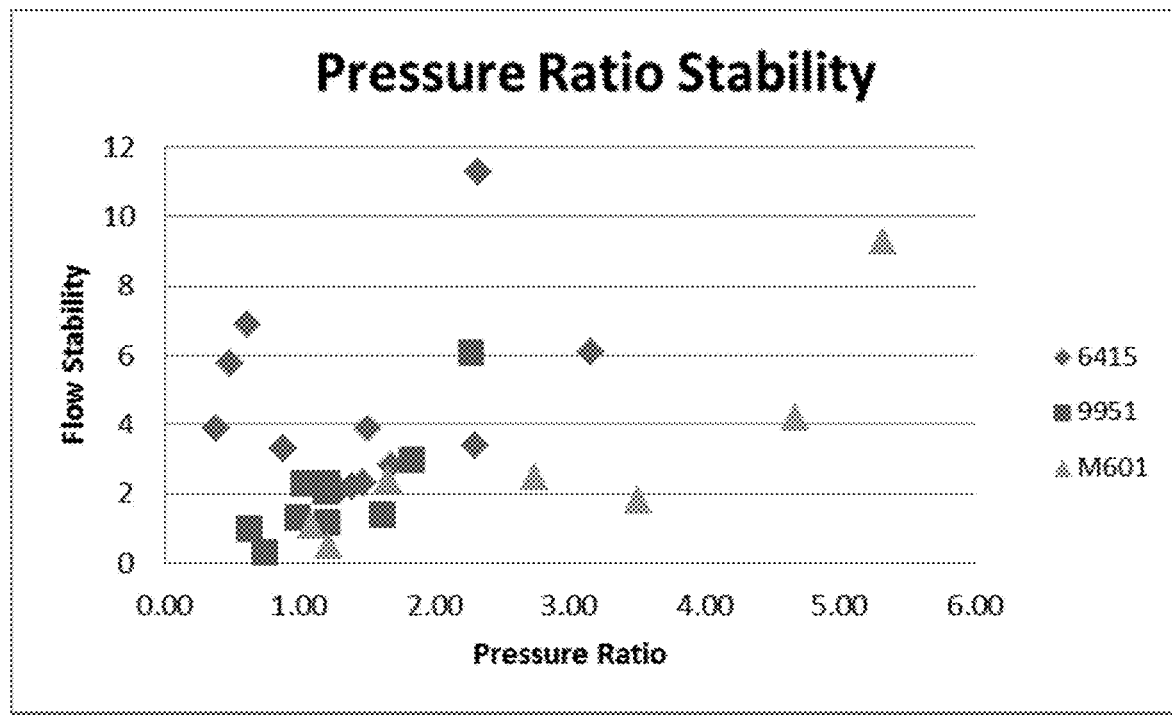
FIG. 9 graphically depicts pressure ratio to upstream hose pressure stability as calculated as a standard deviation in hose pressure.

The results of this test are plotted and shown in FIG. 9. From this graph, it is shown that, when the pressure ratio was between about 0.5 and 2.0, in all cases powder flow was stable with a standard deviation of the hose pressure in a ten second period below 5%.

By performing a real time monitoring and analysis of the powder hose pressure, the inventors found that the instabilities associated with powder flow can be detected, diagnosed, and corrected. Moreover, this method can form a basis for providing a powder feeder with a way for self-diagnosis and self-optimization.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for detecting and/or diagnosing problems with powder conveying, wherein a powder in a carrier gas is guided through a powder feed hose from a hopper to an end process, the method comprising:
   monitoring a pressure in the powder feed hose; and
   based on the monitored pressure, at least one of:
      detecting a missing powder feed hose;
      detecting powder feed hose clogging; or
      detecting and diagnosing powder feed instability,
   wherein a lack of powder feed hose back pressure is indicative of the missing powder feed hose.

2. The method in accordance with claim 1, wherein increasing powder feed hose back pressure is indicative of the powder feed hose clogging.

3. The method in accordance with claim 1, wherein, when the powder feed hose is neither missing nor clogged, the method further comprises calculating a standard deviation in the monitored powder feed hose pressure, wherein a standard deviation in excess of a predetermined value detects feed instability.

4. The method in accordance with claim 3, wherein the predetermined value for the standard deviation is 5% over ten seconds.

5. The method in accordance with claim 3, further comprising digitizing the monitored powder feed hose pressure to calculate the standard deviation.

6. The method in accordance with claim 5, wherein the analyzing of the powder feed hose pressure comprises conducting Fast Fourier Transform (FFT) frequency analysis.

7. The method in accordance with claim 3, wherein, when feed instability is detected, the method further comprises analyzing the powder feed hose pressure to identify periodic oscillation frequencies, wherein, identified oscillation frequencies within a range between 0.4 to about 2.0 Hz are indicative of acoustical oscillations in the powder feed hose, wherein, identified oscillation frequencies lower than 0.4 Hz are indicative of flow transitions having a mass flow rate ratio of the powder to the carrier gas in excess of a predetermined mass flow ratio, and wherein, identified oscillation frequencies higher than 2.0 Hz are indicative of control oscillations caused by a pressure ratio between a differential pressure in the hopper and the powder feed hose pressure outside a predetermined pressure ratio range.

8. The method in accordance with claim 7, at least one of:

wherein the acoustical oscillations are correctable by changing a length of the powder feed hose, wherein the predetermined mass flow ratio is 15 and the flow transitions are correctable by reducing the mass flow ratio to less than 15, or wherein the predetermined pressure ratio range is between 0.5 and 2.0 and the control oscillations are correctable by changing hardware of the feeder.

9. The method in accordance with claim 7, wherein, when the analyzing of the powder feed hose pressure does not identify periodic oscillation frequencies, the method further comprises:

determining whether the mass flow rate ratio of the powder to the carrier gas is in excess of the predetermined mass flow ratio;

determining whether the pressure ratio between a differential pressure in the hopper and the powder feed hose pressure is outside the predetermined pressure ratio range;

one of:
determining whether the differential pressure in the hopper is at an upper end or a lower end of an operating window;
determining whether one of a disc or screw speed is at an upper end or a lower end of an operating range;
determining whether the feeder is damaged; or
determining whether the powder at least one of is wet, is contaminated or has poor flow characteristics.

10. A system for detecting and/or diagnosing problems with powder conveying, comprising:

a powder feed hose through which a powder is conveyed;

a pressure transducer arranged to detect a pressure within the powder feed hose; and feeder diagnostics coupled to the pressure transducer to monitor the pressure within the powder feed hose to at least one of:
detect a missing powder feed hose;
detect a powder feed hose clog; or
detect and diagnose powder feed instability, wherein a lack of powder feed hose back pressure is indicative of the missing powder feed hose.

11. The system in accordance with claim 10, wherein the feeder diagnostics are adapted to analyze the powder feed hose pressure in order to identify periodic oscillation frequencies.

12. The system in accordance with claim 10, further comprising a feeder arranged to dose the powder into the powder feed hose and an end process to which the powder is conveyed through the powder feed hose.

13. The system in accordance with claim 12, wherein the pressure transducer is integrated in the feeder.

14. The system in accordance with claim 12, wherein the feeder diagnostics are integrated in the feeder.

15. The system in accordance with claim 12, wherein the feeder diagnostics are external to the feeder.

16. The system in accordance with claim 12, wherein the pressure transducer is external to the feeder.

17. The system in accordance with claim 16, wherein the pressure transducer is arranged to detect powder feed hose pressure at any point along a powder conveyance path between the feeder and the end process.

18. The system in accordance with claim 16, wherein the pressure transducer is arranged to detect powder feed hose pressure between the feeder and one-half a length of the powder feed hose.

19. The system in accordance with claim 16, wherein the feeder comprises a hopper and the pressure transducer is arranged at an exit of one of the feeder and the hopper.

* * * * *